United States Patent [19]
Hirano et al.

[11] Patent Number: 5,917,593
[45] Date of Patent: Jun. 29, 1999

[54] APPARATUS FOR USE IN CONSTRUCTION MACHINES FOR DETECTING LASER BEAM AND DISPLAYING INFORMATION BASED ON THE SAME

[75] Inventors: Satoshi Hirano; Kazuki Osaragi; Hiroto Shibuya; Takaaki Yamazaki, all of Tokyo, Japan

[73] Assignee: Kabushiki Kaisha Topcon, Tokyo, Japan

[21] Appl. No.: 08/820,523

[22] Filed: Mar. 19, 1997

[30] Foreign Application Priority Data

Mar. 19, 1996 [JP] Japan .................................. 8-089007

[51] Int. Cl.⁶ .............................. G01C 9/02; G06F 15/14
[52] U.S. Cl. ..................... 356/247; 364/423.098
[58] Field of Search ..................... 356/247, 356, 356/400, 4, 72; 364/423.098, 423.099; 172/779, 780, 799, 4.5, 413, 417, 448, 451, 484, 449, 2, 4

[56] References Cited

U.S. PATENT DOCUMENTS

| | | | |
|---|---|---|---|
| 4,273,196 | 6/1981 | Etsusaki et al. | 172/4.5 |
| 4,299,290 | 11/1981 | Nunes, Jr. | 172/4.5 |
| 4,413,684 | 11/1983 | Duncklee | 172/4.5 |
| 4,537,259 | 8/1985 | Funabashi et al. | 172/4.5 |
| 4,807,131 | 2/1989 | Clegg | 364/424.01 |
| 4,820,041 | 4/1989 | Davidson et al. | 356/1 |
| 5,375,663 | 12/1994 | Teach | 172/4.5 |

FOREIGN PATENT DOCUMENTS

5202P135  11/1998  European Pat. Off. .

*Primary Examiner*—Frank G. Font
*Assistant Examiner*—Michael P. Stafira
*Attorney, Agent, or Firm*—Foley & Lardner

[57] ABSTRACT

In the displaying apparatus for a construction machine with a blade having a level sensor disposed above the blade and designed such that laser beams serving as a datum is detected by the level sensor and the information based on the detected datum is displayed on a remote display, a light emitting device for signal transmission is provided for the level sensor and a light sensing device corresponding to the light emitting device is provided for the remote display, whereby the information is transmitted by means of the lightwave signal from the light emitting device to the light sensing device.

6 Claims, 17 Drawing Sheets

F I G. 5
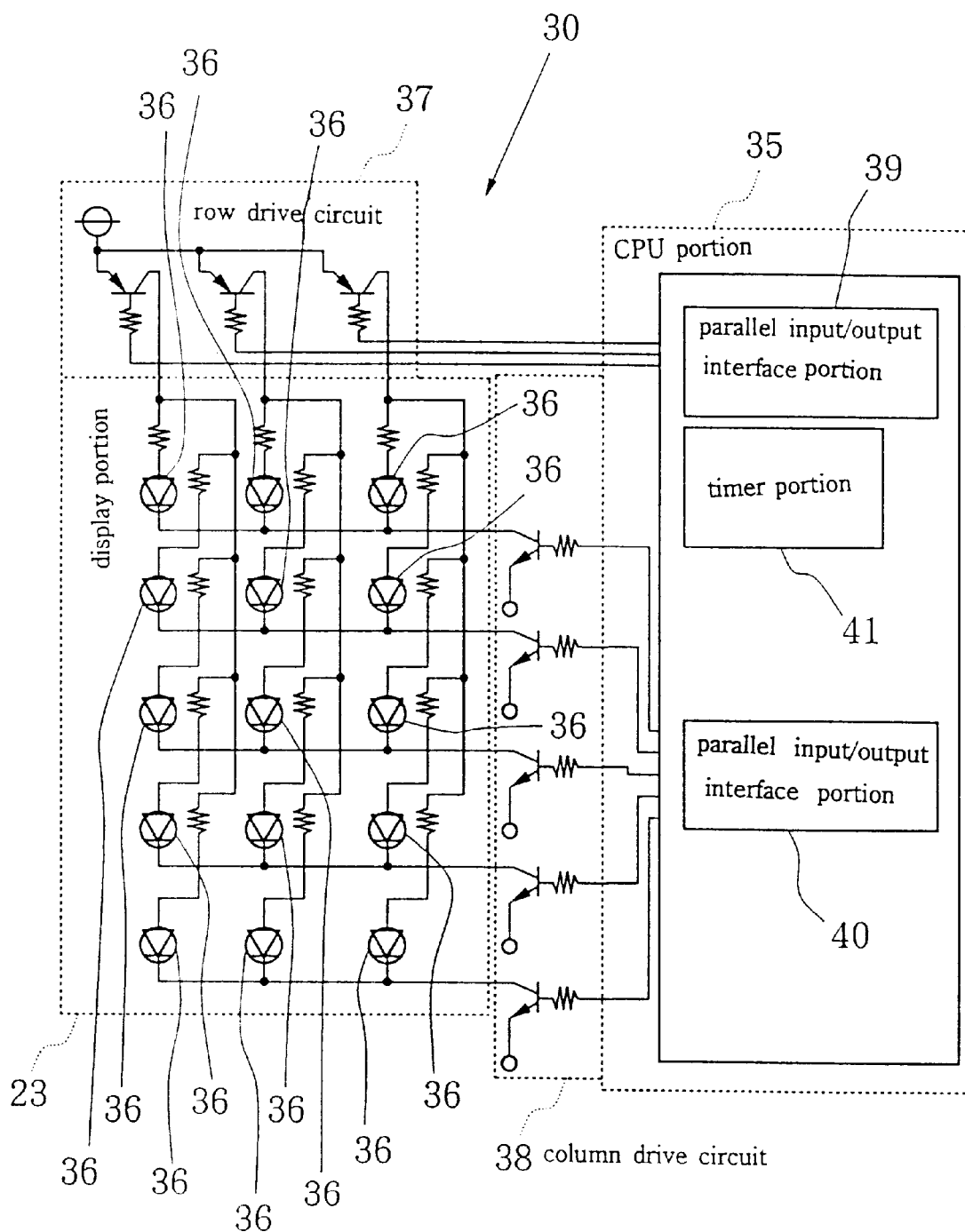

(a) Analog signal — Reference signal (b) Digital signal (a)

Analog signal (b)

Number of times of cumulative additions

0 accumulation signal

F I G. 16
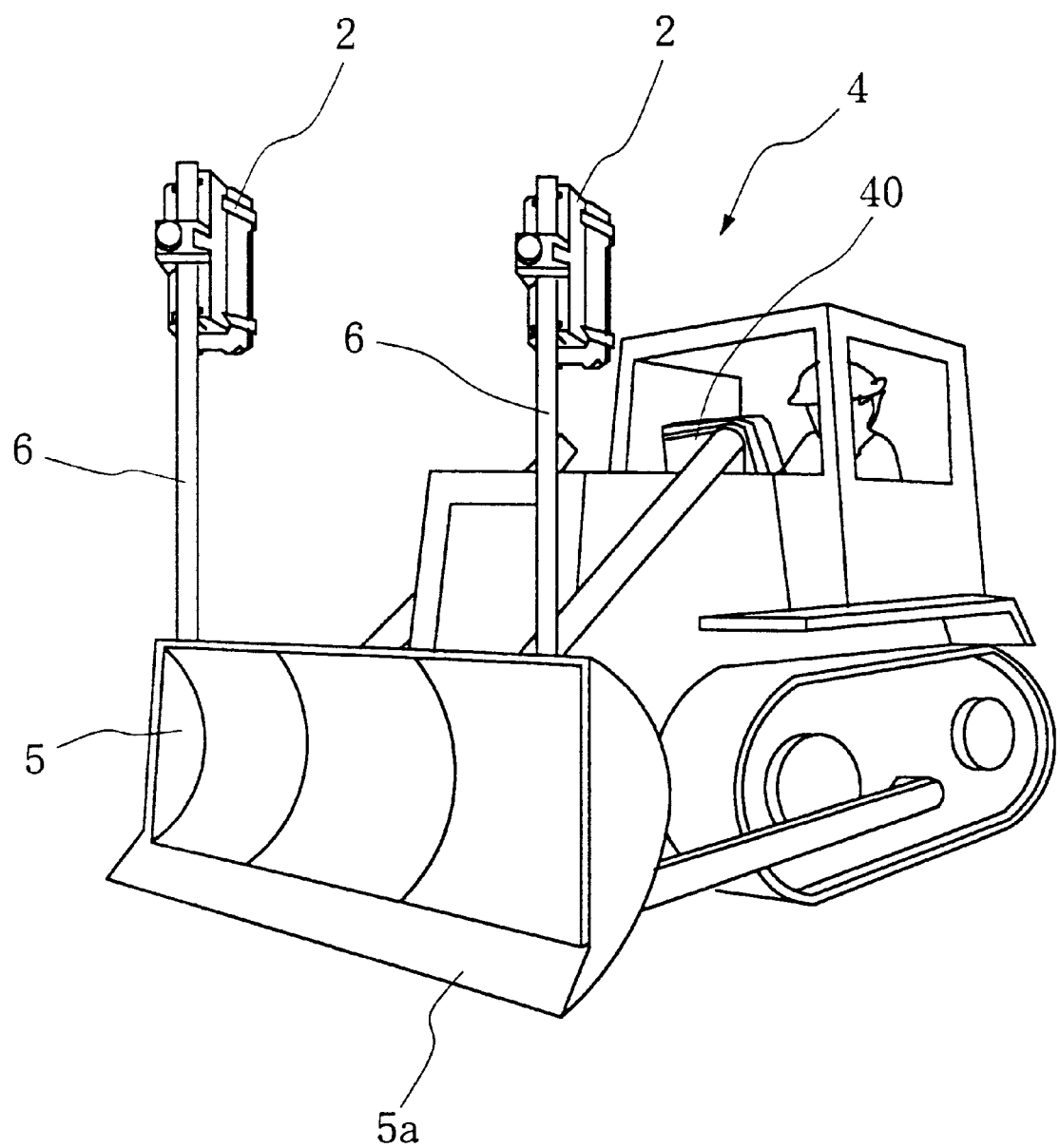

APPARATUS FOR USE IN CONSTRUCTION MACHINES FOR DETECTING LASER BEAM AND DISPLAYING INFORMATION BASED ON THE SAME

BACKGROUND OF THE INVENTION

The present invention relates to a displaying apparatus for use in construction machines with a blade having a level sensor disposed above the blade for detecting laser beams serving as a datum by means of the level sensor and displaying the information based on the detected datum on a remote display.

In civil engineering work such as creating land by leveling the ground, construction (engineering) machinery with a blade such as bulldozers and crawlers are used.

In the past, the operator of the construction machine, while proceeding with such ground leveling work by eye measure, frequently made surveys to check the levelness of the land in the course of the work.

Recently, however, by the use of a rotating laser device, it has become possible for the operator of a construction machine to directly check the levelness while sitting in the operator's seat. Namely, laser beams serving as a datum plane are detected by a level sensor provided above the blade and the direction of a deviation of the ground from the datum plane is displayed on a display.

In order that the laser beams are not screened by the body of the construction machine or the like, such a level sensor is placed by means of a pole at a relatively high position above the blade. Therefore, especially when the construction machine is large, the level sensor is kept apart from the operator (for example, 5 m) and the display becomes difficult to see.

In such a case, a remote display is provided close to the operator's seat so that it becomes easier for the operator to read the content of the display.

It has so far been practiced to connect the remote display and the level sensor by a cable or by radio.

When a display and a level sensor are connected by a cable, the cable is strung between the body of the construction machine and the blade. Since the blade violently moves and suffers a severe shock during the land creating work, sometimes interference is produced on the cable or the cable itself gets in the way of the moving blade.

Laying the cable free from such an interference and falling off requires a certain time and labor and it costs accordingly.

On the other hand, when communication is held by a radio wave, since the radio wave has no directionality, such a thing sometimes occurs, when a plurality of construction machines work at spots in close vicinity, that the remote display is disturbed by a radio wave from a level sensor not of its own and causes a malfunction.

To prevent such a malfunction from occurring, it will be effective to previously adjust the frequency for each pair of the level sensor and the remote display. However, making such initial adjustments is troublesome.

SUMMARY OF THE INVENTION

It is an object of the invention to provide a displaying apparatus for construction machines with a blade solving the above mentioned difficulties with the conventional art, capable of tolerating well violent motions of the construction machine with blade, and free from causing a malfunction of the remote display even when a plurality of construction machines work at spots in close vicinity.

In the displaying apparatus for a construction machine of the invention, i.e., in the displaying apparatus for a construction machine with a blade having a level sensor disposed above the blade and designed such that laser beams serving as a datum are detected by the level sensor and the information based on the detected datum is displayed on a remote display, a light emitting device for signal transmission is provided for the level sensor and a light sensing device corresponding to the light emitting device is provided for the remote display, whereby the information is transmitted by means of the lightwave signal from the light emitting device to the light sensing device. Therefore, the level sensor does not cause a malfunction due to a signal from another level sensor.

It is preferred that two level sensors be disposed above the blade with one on the left-hand side and the other on the right-hand side so that information from each level sensor is displayed on the display. Through such arrangement, inclination of the blade to the left or right can be checked and the ground leveling work can be carried out more efficiently.

It is preferred that a longitudinally elongated filter be disposed on the outer side of the light sensing device so that the directionality of the light sensing device becomes ±15 degrees to ±25 degrees in the horizontal direction and ±50 degrees to ±90 degrees in the vertical direction. Thereby, the apparatus is enabled to cope well with motion of the blade in the vertical direction.

BRIEF DESCRIPTION OF THE DRAWINGS

An embodiment of the invention will be described with reference to the accompanying drawings, in which:

FIG. 5 is a diagram showing drive circuits of a display portion;

FIG. 16 is a perspective view showing a bulldozer equipped with the displaying apparatus for construction machine of the invention;

FIGS. 18(a) and (b) are diagrams showing characteristics of the light emitting device of the level sensor, of which FIG. 18(a) shows emission spectrum and (b) shows directionality;

FIGS. 19(a) and (b) explanatory drawings of light sensing directionality of the remote display, of which FIG. 19(a) is for the directionality in the horizontal direction and FIG. 9(b) is for that in the vertical direction.

DESCRIPTION OF THE PREFERRED EMBODIMENT

Figure 1:
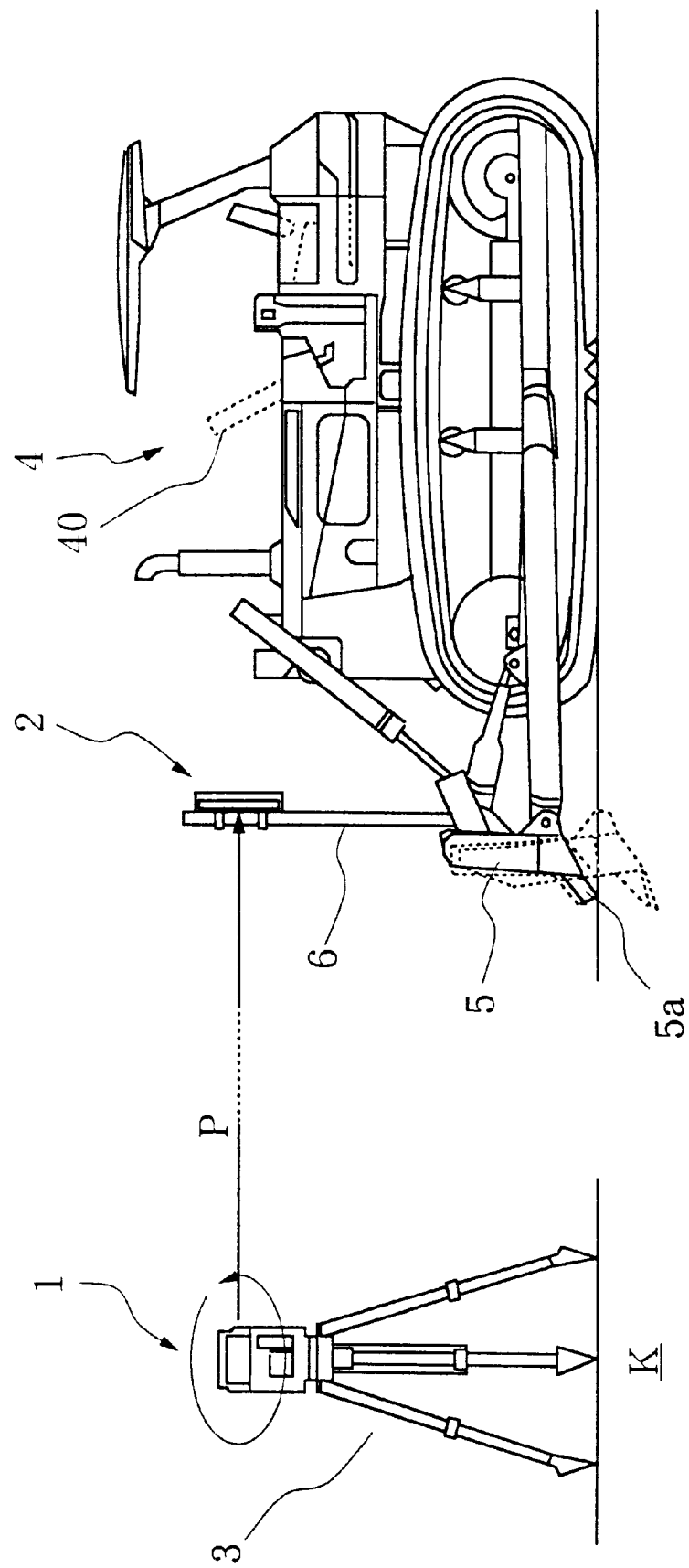
FIG. 1 is a plan view of a scene of engineering work being carried out by the use of a bulldozer equipped with the displaying apparatus for a construction machine of the invention.

FIG. 1 is a plan view showing a scene of engineering work being carried out by the use of a bulldozer equipped with the displaying apparatus for a construction machine of the invention.

A rotating laser device 1 is installed, through a three-legged support 3, at a fixed point K on the ground being cleared. A datum plane is formed by laser beams P emitted from the revolving laser device.

The displaying apparatus indicating the proper elevation to the operator, in cooperation with the laser beams P, is installed on the bulldozer 4.

The displaying apparatus is formed of a level sensor 2 for detecting the laser beams P and a remote display 40 for indicating to the operator the deviation from the proper elevation on the basis of the detection made by the level sensor 2. In the present embodiment, the level sensor 2 also has a display portion 23.

Figure 2:
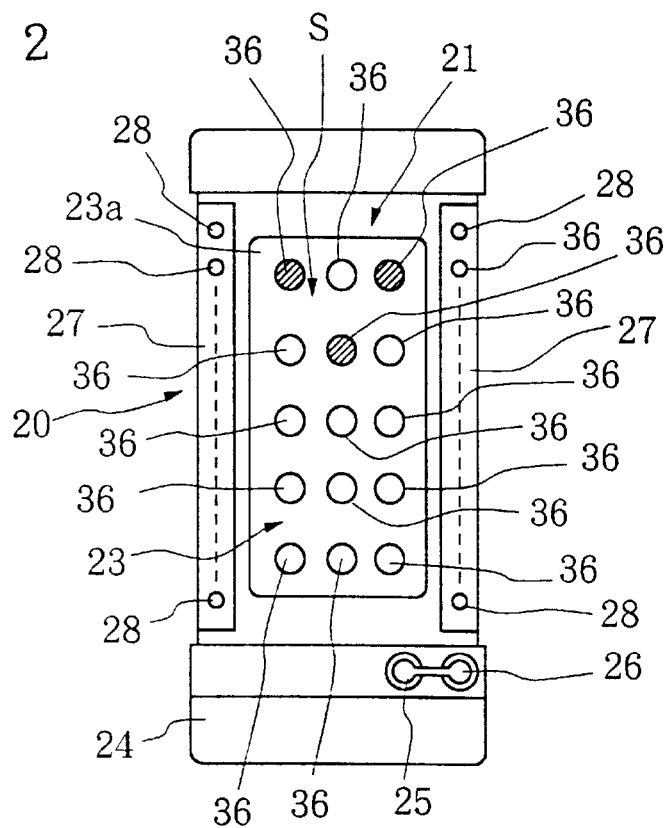
FIG. 2 is a front view of the level sensor in FIG. 1.
Figure 3:
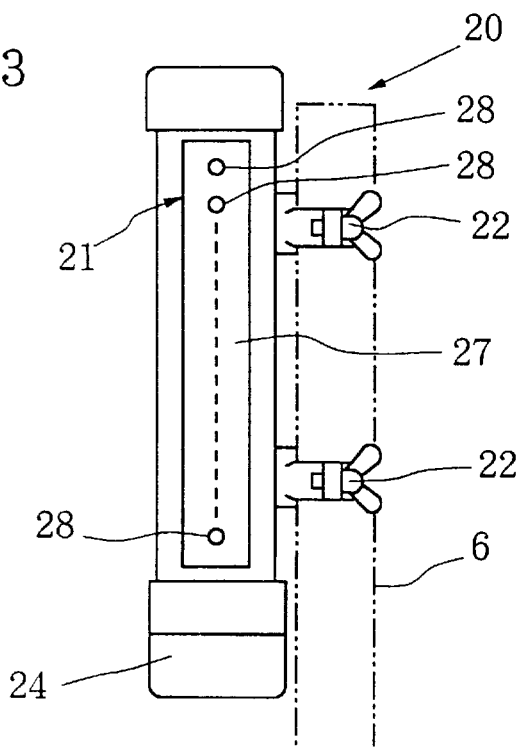
FIG. 3 is a side view of the level sensor in FIG. 1.

FIGS. 2 and 3 are a front view and a side view showing the level sensor.

The level sensor 2 as a whole is contained in a box-type casing 21, which has the display portion 23 on its wide face and light sensing portions 27 on its both side faces.

On the side reverse to the display portion 23, there is provided a pole clamp 22 and the level sensor 2 is attached, by means of the pole clamp 22, to a pole 6 extended upward from the blade. The level sensor 2 is fixed in place so that its display portion 23 confronts the operator's seat of the bulldozer 4.

As shown in FIG. 16, there are provided two poles 6 on both left and right sides of the blade 5 and one level sensor 2 is attached to each of the poles. By disposing the level sensors 2 on both left and right sides of the blade 5, it becomes possible to detect not only a deviation of the blade 5 in the vertical direction but also an inclination of the blade 5 to the left or right Below the level sensor 2, there is provided a battery housing 24 so that power can be obtained from NiCd storage battery, NiH storage battery, or the like housed therein. Adjacent to the battery housing 24, there are provided a data output connector portion 25 and an outer power source connector portion 26. The outer power source connector portion 26 is used for connecting thereto a power cable from the battery on the bulldozer 4. The data output connector portion 25 is used for displaying elevation information on another displaying apparatus according to need.

On both sides of the level sensor 2, there are disposed the light sensing portions 27. The light sensing portion 27 is formed of a plurality of photosensors 28 arranged in a single column.

The elevation from the ground surface at the fixed point K to the datum plane of the rotating laser device 1 is correlated with the elevation from the edge 5a of the blade to the light sensing portion 27. Therefore, by carrying out the land creating work so that the laser beams P are detected at a predetermined elevation of the light sensing portion 27, the ground leveling work can be achieved as planned.

Figure 4:
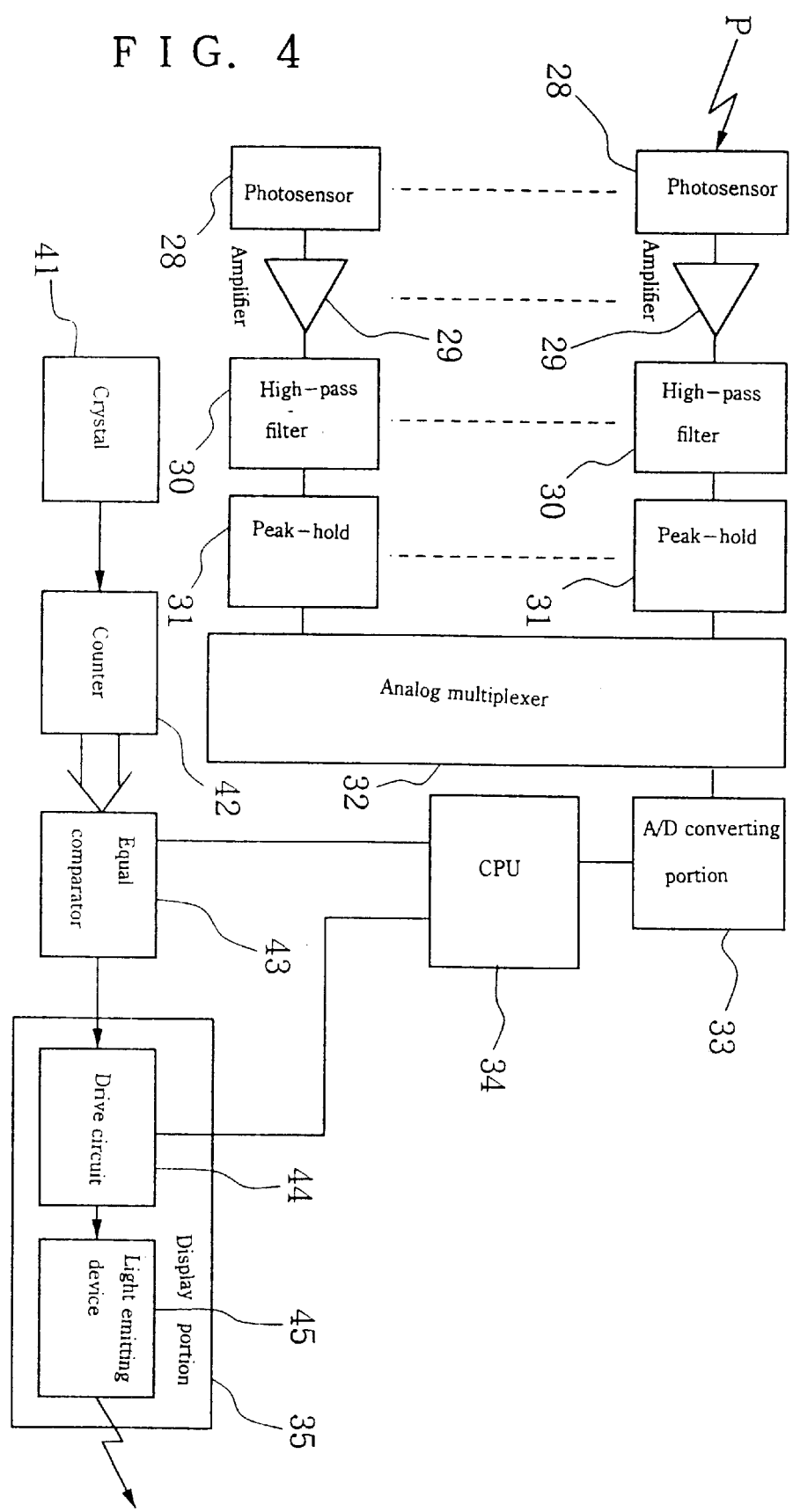
FIG. 4 is a block diagram showing the function of the level sensor.

The photo-detection output of each of the photosensors 28 is sent to a processor circuit shown in FIG. 4. The processor circuit is disposed within the casing 21 of the displaying apparatus.

The photo-detection outputs are first amplified by the respective amplifiers 29 and then led to high-pass filter portions 30.

The emitted laser beams are modulated. Although each photosensor 28 outputs its photo-detection signal including external noise light, the detection signal due to the external noise light is cut off by the high-pass filter portion 30.

The photo-detection signals passed through the high-pass filter portions 30 are led to peak-hold portions 31 and the peak-hold portions 31 keep up the peak value of the photo-detection signals.

Each of the peak-hold portions 31 is connected to an analog multiplexer 32 and the analog multiplexer 32 performs sampling of the photo-detection signals from the photosensors 28. The analog multiplexer 32 identifies each photo-detection signal as output from which of the photosensors 28.

The photo-detection signal is analog-to-digital converted in an A/D converter portion 33 and input to a CPU portion 34 of a control portion.

On the display portion 23, there are disposed displaying light sources 36 in a 3×5 matrix array, for example. As the displaying light sources 36, known light sources such as light emitting diodes and liquid crystals can be used. The displaying light sources 36 are screened by a translucent dark-colored cover 23a and they can be recognized by eye from outside only when they are turned on.

The displaying light sources 36 are controlled to turn on/off by a row drive circuit 37 and a column drive circuit 38 shown in FIG. 5.

The row drive circuit 37 is controlled by a parallel input/output interface portion 39 of a CPU portion 35 and the column drive circuit 38 is controlled by a parallel input/output interface portion 40 of the CPU portion 35. Reference numeral 41 denotes a timer portion for controlling the time for displaying.

The CPU portion 34 is designed to display an elevation correcting indication signal S mentioned below according to what photosensor 28 of the photosensors 28 arranged in the vertical direction has detected the emitted laser beams.

Namely, when the position at present of the edge 5a of the blade is too high above the proper elevation, an elevation correcting indication signal S1 is displayed to look as if the signal as a whole is moving downward. When, conversely, the blade edge 5a is too low, an elevation correcting indication signal S2 is displayed to look as if the signal as a whole is moving upward.

Further, when the deviation is great, control is executed so that the moving speed of the elevation correcting indication signal S1 or S2 is high and, when the deviation has become smaller, the moving speed is decreased.

By controlling the elevation correcting indication signal S1 or S2 in the described manner, the operator of the bulldozer can recognize the elevation correcting indication at a glance by intuition. Further, since the elevation correcting indication signal S1 or S2 is moving, the operator is not required to gaze at the signal but can recognize it at a corner of the field of vision while continuing the ground leveling work. Further, even when the operator's seat is jolting, the operator can positively recognize the indication. If the operator gets skilled to a certain degree, it becomes even possible to recognize the displayed contents on both the left-hand and the right-hand display portions at the same time by intuition.

Figure 6:
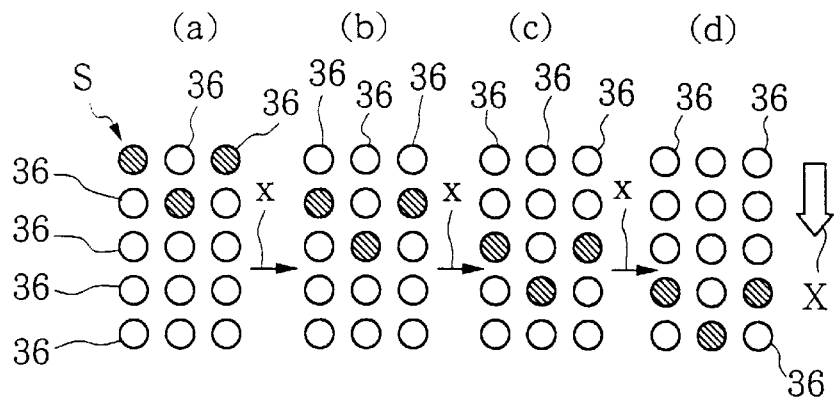
FIG. 6 is an explanatory drawing of a manner of turning on some light sources in the display portion.

In FIG. 6, there are shown three turned-on displaying light sources 36 indicated by oblique lines. The triangular mark formed of the three light sources as the elevation correcting indication signal S1 projects an image of an arrowhead turning down and the direction of the arrowhead indicates the direction in which the blade edge 5a should be moved. Further, the moving speed of the arrowhead indicates the distance the blade edge 5a has to go for resolving the deviation in the elevation.

When the deviation in the elevation is great, the triangular mark is moved quickly at intervals, for example, of 100 msec, and when the deviation is small, it is moved slowly at intervals, for example, of 400 msec. The control of the turn-on interval is executed by utilizing the timer portion 41.

Figure 7:
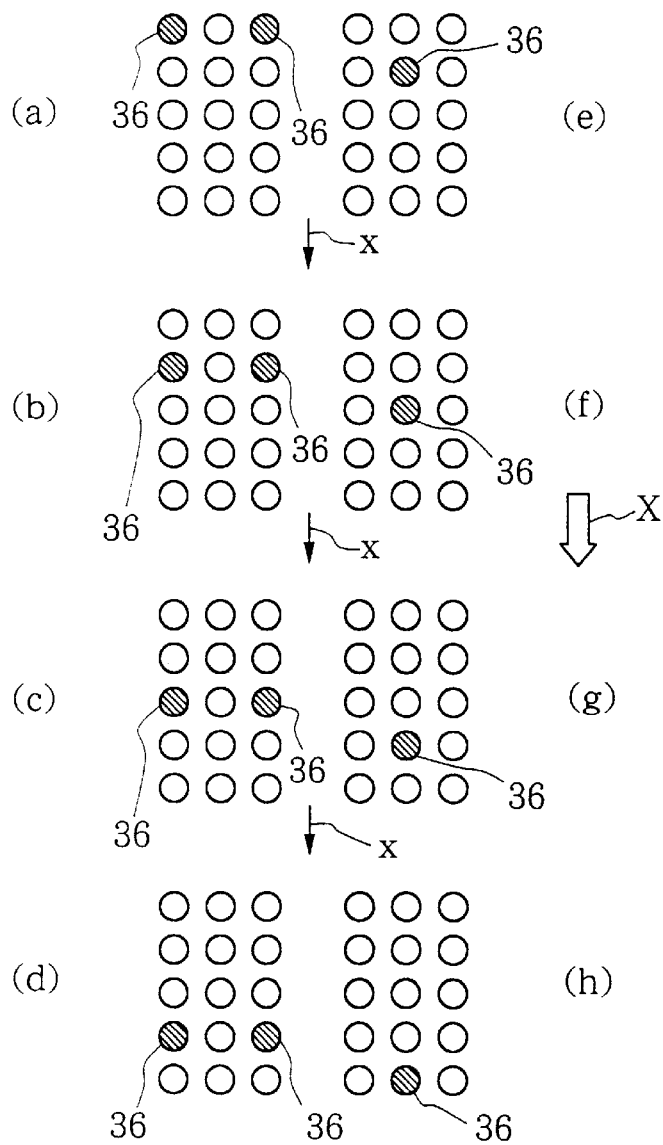
FIG. 7 is an explanatory drawing of another manner of turning on some light sources in the display portion.

Triangular marks can also be realized by using the method shown in FIG. 7. Namely, only two of the three displaying light sources 36 are sequentially turned on as indicated by (a) to (d) and the remaining one light source 36 is turned on as indicated by (e) to (h) a period of time of 10 msec, for example, after the turn-on of the two light sources 36. Thus, by making use of the afterimage in the human eye and generating the correction indicating signal through the method of delaying for a period of time shorter than the duration of the afterimage, power saving can be achieved.

Other marks than the triangular mark such as, for example, an arrow mark may be used as the elevation correcting indication signal.

Figure 18A:
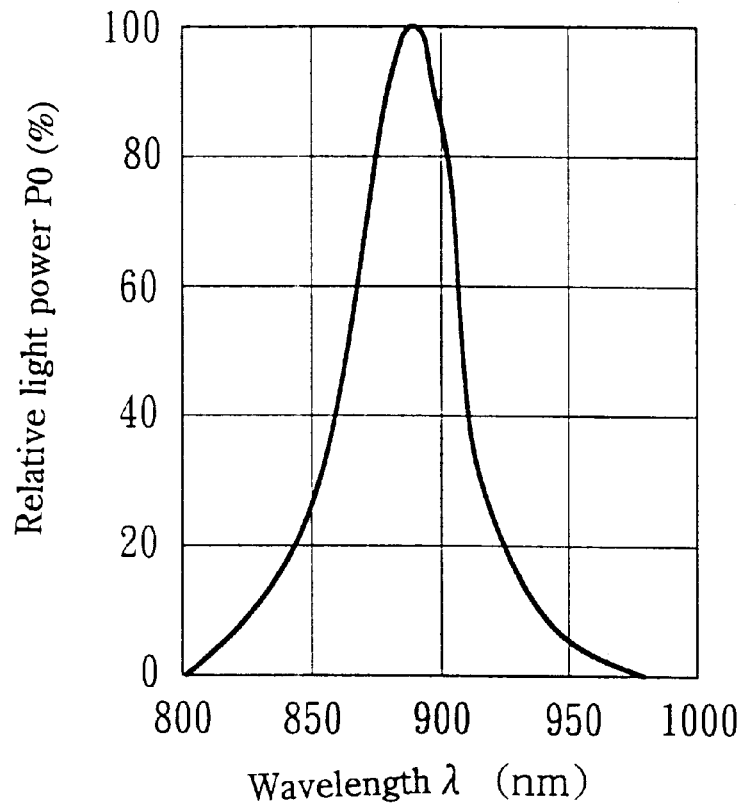
Figure 18B:
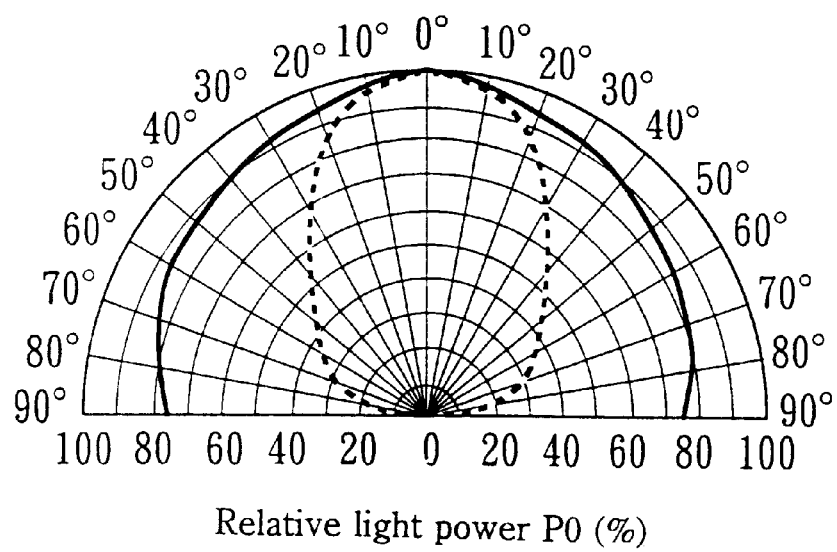

Below the display portion 23 of the level sensor, there is disposed a light emitting device 90 for signal transmission. The light emitting device 90 is constituted of an LED, for example, and it emits a light beam having a certain directionality. Its characteristics are shown in FIGS. 18(a) and (b), in which FIG. 18(a) shows the emission spectrum and (b) shows the directionality characteristics.

The light emitting device 90 is disposed in confronting relationship with the light sensing portion 99 of the remote display 40 and lightwave communication is held between these members. Detailed description as to the lightwave communication will be given later.

In the operator's seat of the bulldozer, as shown in FIG. 19, there are disposed two remote displays 40 side by side corresponding to the two level sensors 2 on the left and right.

Figure 10:
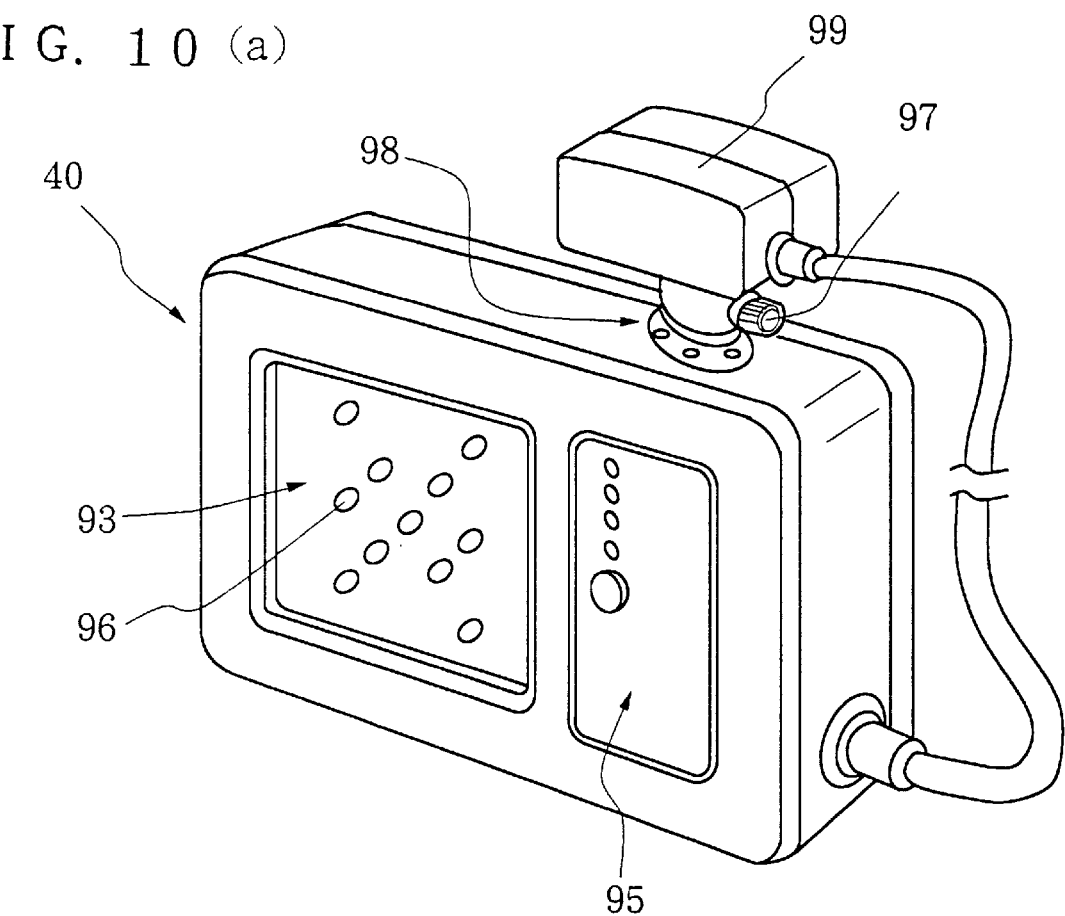
FIG. 10(a) is a perspective view showing a remote display.
FIG. 10(b) is a perspective view of the light sensing portion of the remote display.
Figure 10:
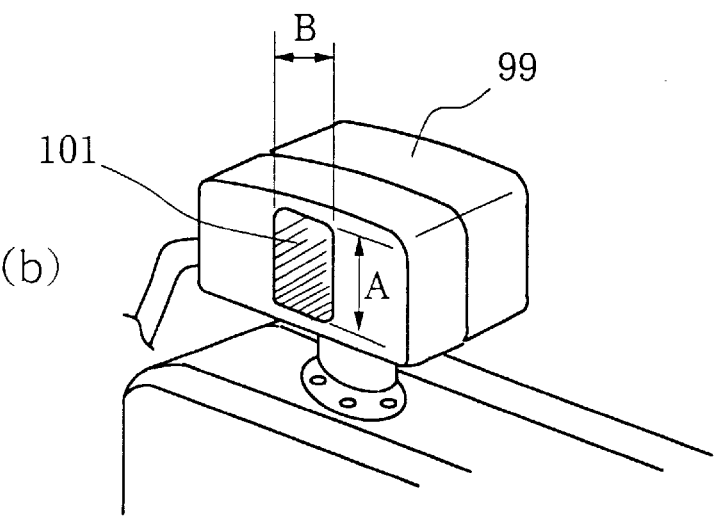

As shown in FIG. 10, the light sensing portion 99 is disposed at the top of the body of the remote display. The light sensing portion 99 is provided with a light sensing device 11 constituted of a photodiode PD or the like.

Figure 11:
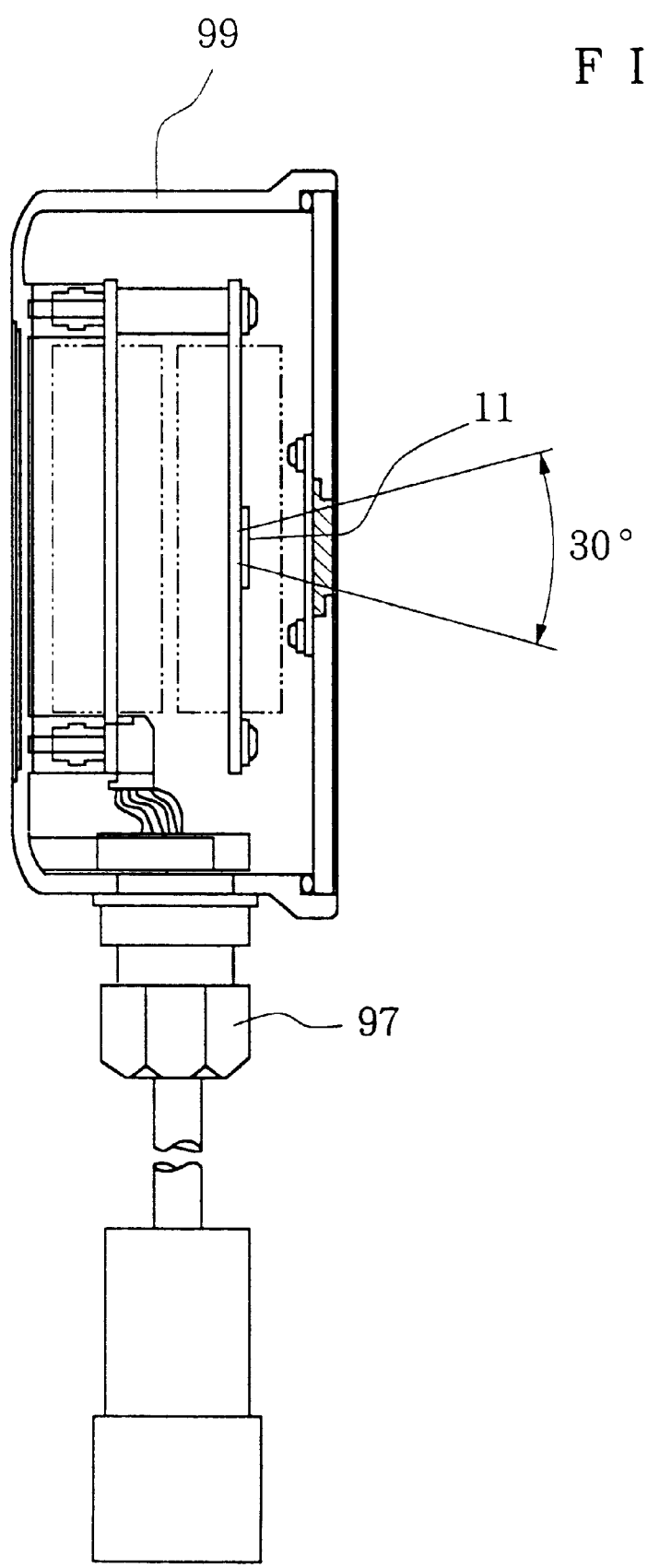
FIG. 11 is a sectional view of the light sensing portion seen from above.
Figure 12:
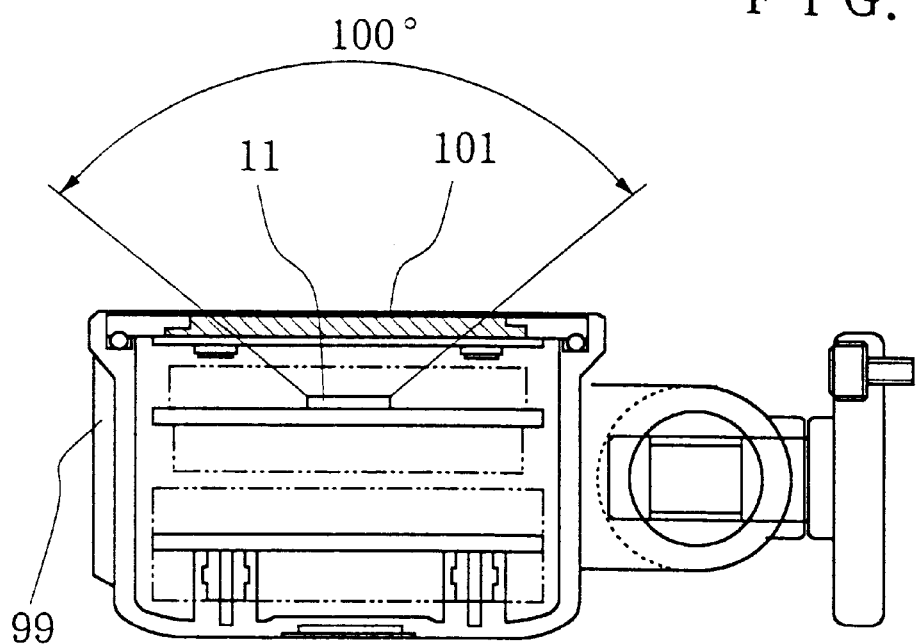
FIG. 12 is a sectional view of the light sensing portion seen from side.

As shown in FIG. 11 and FIG. 12, a longitudinally elongated filter 101 is disposed on the outer side of the light sensing device 11. The directionality in the lateral direction X and the directionality in the longitudinal direction Y of the light sensing device 11 are determined by the aspect ratio of the filter 101.

Figure 19A:
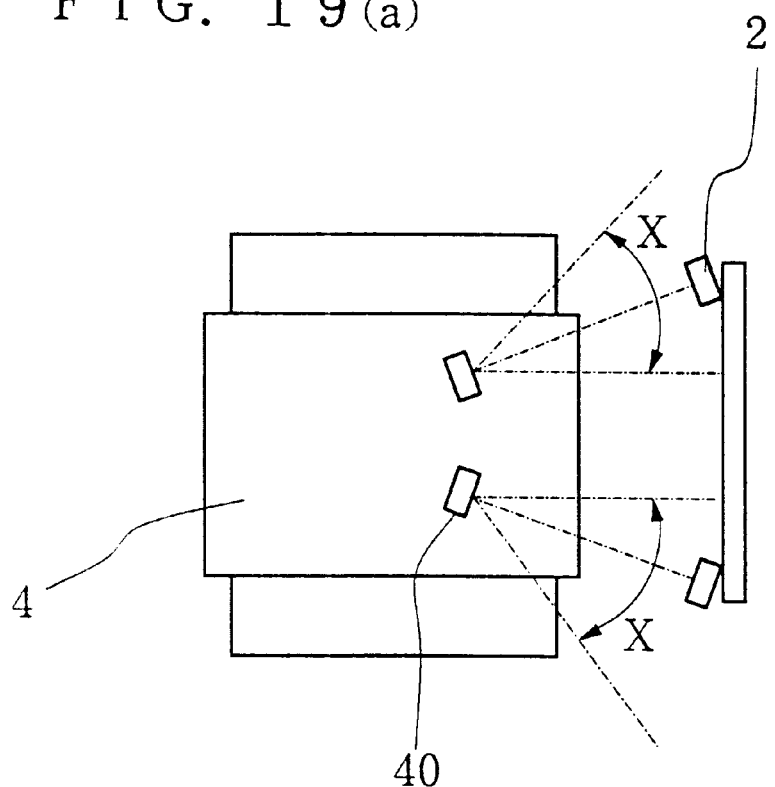
Figure 19B:
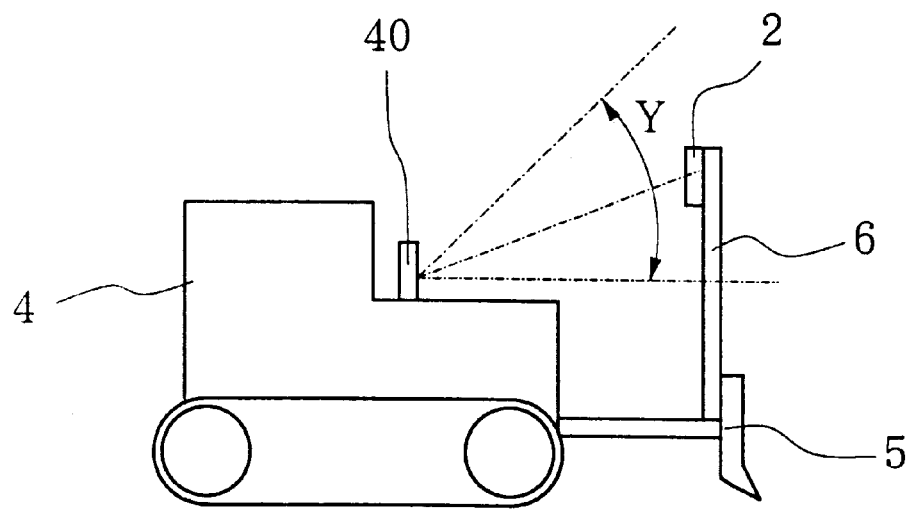

The lateral directionality X of the light sensing device 11 shown in FIG. 19(a) is ±10 degrees to ±30 degrees. The longitudinal directionality Y shown in FIG. 19(b) is ±10 degrees to ±90 degrees. Preferred values of the directionality of the filter are determined in accordance with the distance between it and the blade and the moving range of the blade. In general cases, the lateral directionality X is set to ±20 degrees to ±25 degrees and the longitudinal directionality Y is set to ±40 degrees to ±60 degrees.

By setting up the directionality in both lateral and longitudinal directions as described above, it becomes possible to cope well with up and down movements of the blade and, further, either of the signals from the left and right level sensors 2 is prevented from entering the wrong light sensing device 11 by error.

Figure 20:
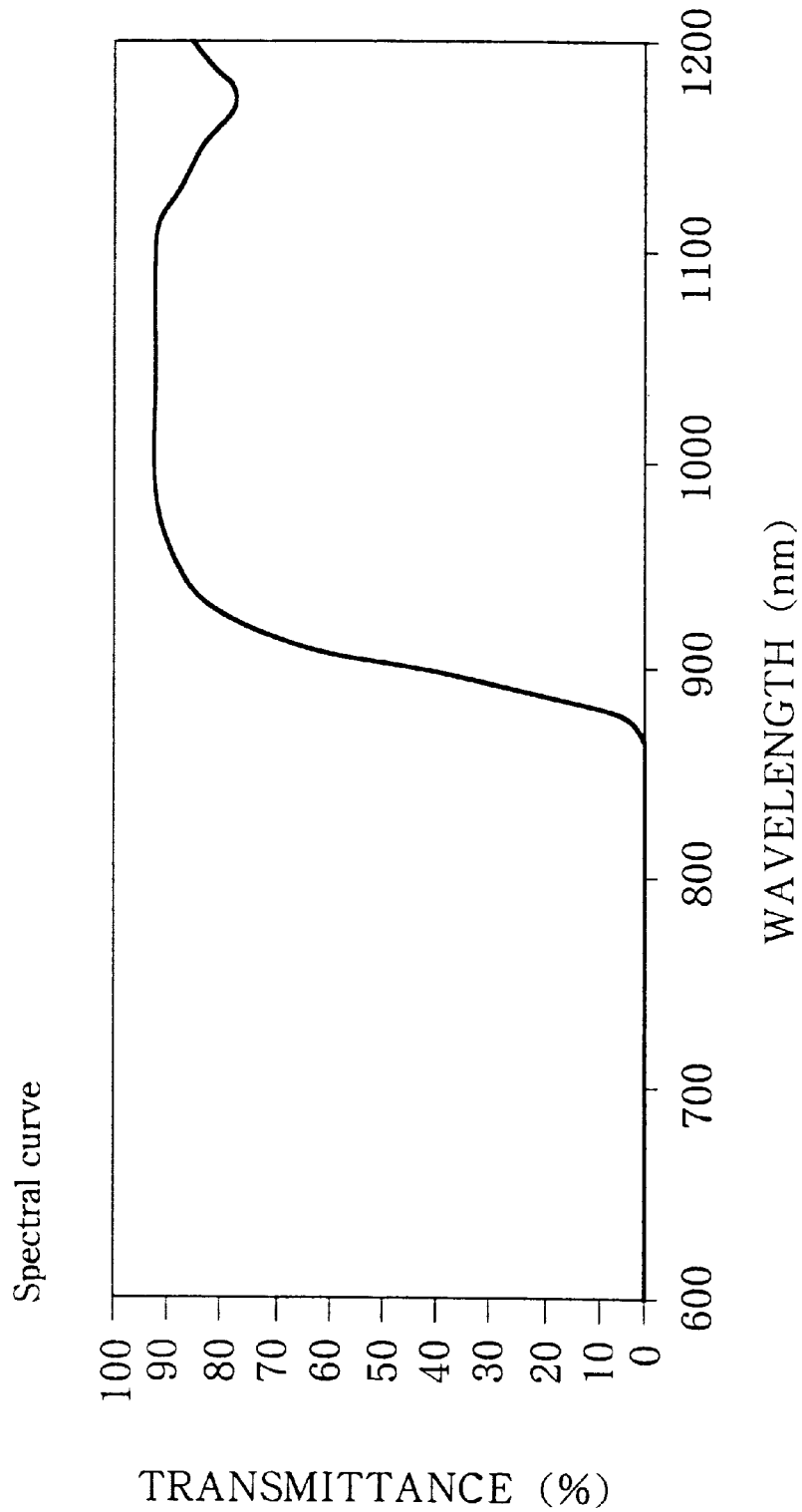
FIG. 20 is a graph showing an example of the characteristic of a filter used in the light sensing portion of the remote display.

The filter 101 is made from such a material as an ordinary methacrylic resin. An example of the characteristic of the filter 101 is shown in FIG. 20. The thickness of the filter 101 is 2 mm for example.

On the side of the remote display body facing the operator, there is disposed a display portion 93 similar to the display portion 23 of the level sensor. The information of the proper elevation displayed on the display portion 93 is essentially the same as that displayed on the display portion 23 of either left or right level sensor corresponding thereto.

Below will be described the lightwave communication held between the light emitting device of the level sensor 2 and the light sensing device of the remote display 40. In this lightwave communication, information about the deviation from the datum plane is transmitted. According to this information, the light sources of the remote display are turned on As long as an ordinary system is used, a considerably great light power is required of the light emitting side because relatively large noises due to sunbeams and the like are produced in the lightwave communication. Accordingly, it is designed in this embodiment to decrease the S/N ratio to less than 1 so that the light power from the light emitting side is reduced and, further, to decrease the duty cycle of the light pulse emitted from the light emitting side to less than 50% so that the electric current consumed in the light emitting side is reduced.

For that purpose, highly stable oscillation sources are used on both the light emitting side and the light sensing side and a synchronous period of time is set up such that an averaging process of the signal is performed in this period of time.

The averaging process is such that pulsed lightwave signals of the type in which the same signal is repeatedly, or cyclically, delivered are successively, or cumulatively, added a number of times (accumulated) to thereby achieve the averaging.

To be concrete, the transmitted signals are first subjected to sampling at the repetition cycle and then subjected to analog-to-digital conversion. The sampled signals are successively added and the accumulated value is stored in memory. The contents of the memory are all cleared at first or the signal for the first cycle of the pulsed lightwave is not included in the addition. Thus, cumulative additions for the predetermined number of times can be performed when the predetermined number of cycles of the pulsed lightwave have ended. Then, by dividing the accumulated value by the predetermined number of times, the averaging can be achieved.

Further description will be given as to the averaging process. Generally, when there is no pulse signal, a noise signal with a noise component superimposed on the DC bias component of the circuit is output. If such signals are averaged by following the above described procedures, the averaged value converges to the bias component because the noise components are generated at random. When there is present a pulse signal, the output signal becomes such that has the bias component of the circuit and the noise component, with the signal component added thereto. If such signals are averaged, the averaged value converges to a value of the bias component with the signal component added thereto.

Therefore, even if the SIN ratio is less than 1, it is possible to detect only the signal component contrasted against the noise component.

The method so far described has been such that uses A/C conversion. A simplified method can be devised by configuring the circuits as follows.

Figure 13:
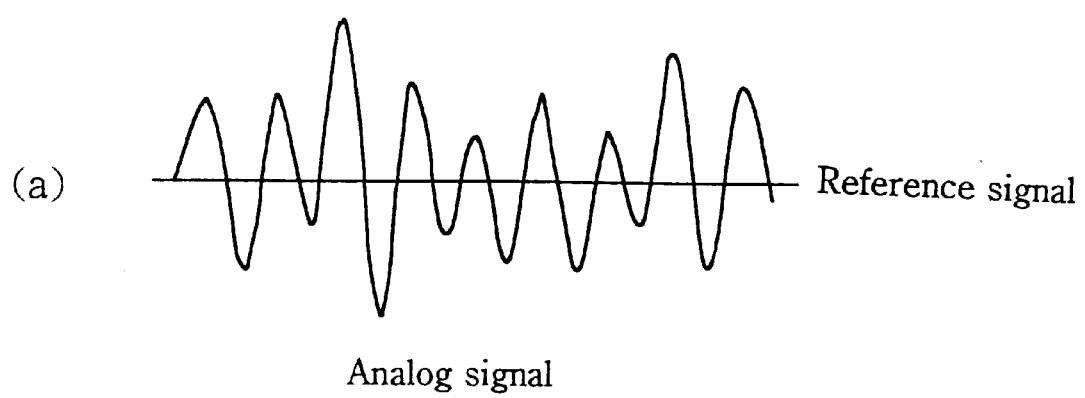
FIG. 13 shows analog and digital signals in which (a) and (b) are explanatory drawings of lightwave communication held between the level sensor and the remote display.
Figure 13:
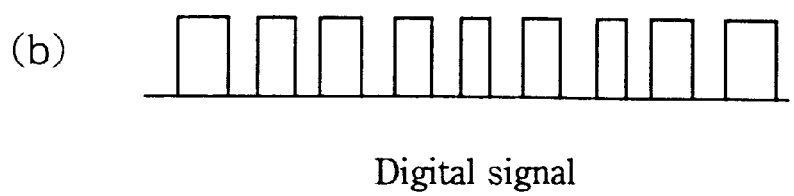

By using an analog comparator which has been given a reference signal whose value is around the circuit bias, an analog signal is converted into a binary digital signal (refer to FIG. 13) and, then, the binary signal is subjected to sampling at the repetition cycle of the pulse signal and the sampled signals are cumulatively added and stored in memory.

If, here, the reference value of the analog comparator is adjusted to the circuit bias and there is no pulse signal, the result obtained by the accumulation converges to ½ because the probability of occurrence of "I" and "0" in the binary signal is ½.

When the pulse signal is greater than the noise, either "1" or "0" is generated depending on the positiveness or negativeness of the signal and, hence, the result of the accumulation will become either the number of times of the cumulative additions or 0 as shown in FIG. 10.

Figure 14:
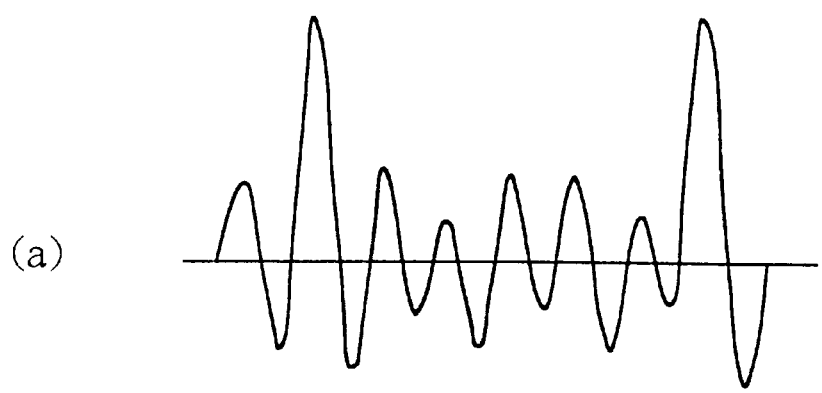
FIG. 14 shows analog and accumulation signals in which (a) and (b) are explanatory drawings of lightwave communication.
Figure 14:
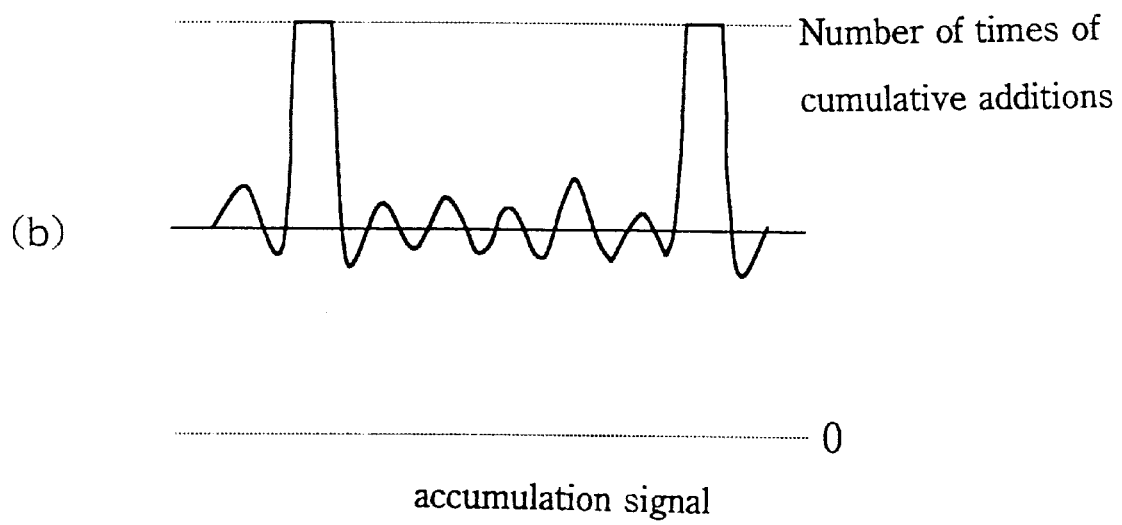

On the other hand, when the pulse signal is smaller than the noise, the result of the accumulation, depending on positiveness or negativeness of the signal, takes on the value, as shown in FIG. 14, expressed as: number of times of cumulative additions/2< value of accumulation, or value of accumulation<number of times of cumulative additions/2. Since the accumulated value during the time period in which there is no signal can be converged to ½ by increasing the number of times of the cumulative additions, the S/N ratio can be made smaller than ½.

However, when the reference value of the analog comparator is not completely equal to the circuit bias, the accumulated value during the time period in which there is no pulse signal deviates from ½ of the number of times of the cumulative additions. Therefore, when an improvement in the S/N value is aimed at as usual, the reference value of the analog comparator should preferably be set equal to the circuit bias. However, it sometimes is preferred to shift the reference value from the circuit bias for convenience of post-processing. Therefore, the reference value of the analog comparator may be set to an optimum value in conformity with the overall configuration of the apparatus.

The level sensor 2 is provided with the light emitting device 90 having a certain directionality as described before. The configuration of a modulation circuit for the light emitting device 90 will be described with reference to FIG. 4.

A highly stable reference clock is obtained from a crystal 41. The frequency of the signal from the crystal 41 is divided by a counter 42. The output signal of the counter 42 is input to an equal comparator 43. The equal comparator 43 generates an output signal when the value of the counter 42 has reached a predetermined value. By means of the equal comparator 43, a signal with a necessary waveform based on the reference clock and having a duty cycle below 50% is obtained. On the basis of this signal, a drive circuit 44 causes the light emitting device 90 to emit light and thereby a lightwave signal is issued.

Meanwhile, the remote display 40 is provided with the light sensing device 11 for detecting the lightwave signal from the light emitting device 90 and a circuit on the light detection side. The configuration of the circuit on the light detection side of the remote display will be described with reference to FIG. 8 and FIG. 15.

In front of the photo-sensing surface of the photodiode (PD) 11, there is provided an optical filter 10. In the event of direct rays of the sun and the like impinging on the PD 11, shot noises are generated over the entire frequency band and hence the S/N ratio is lowered. Therefore, the optical filter 10 is used to cut off the range of wavelengths other than the wavelength emitted by the light emitting device 90 on the light emitting side and reduce the shot noises.

The lightwave signal from the light emitting side is photoelectrically converted into a current signal by the PD 11. FIG. 15(b) shows the current waveform obtained by the photoelectrical conversion of the lightwave signal component. The current signal is converted into a voltage signal by a resonance circuit 12. FIG. 15(c) shows the output waveform of the resonance circuit corresponding to the current signal component. By setting the resonant frequency of the resonance circuit 12 equal to the frequency of the fundamental wave component of the lightwave signal from the light emitting side, DC components due to external light or high-frequency components of the lightwave signal are eliminated and only the fundamental wave component of the lightwave signal is converted into the voltage signal. The Q of the resonance circuit 12 is set to such a value that is not affected by variations in the center frequency due to ambient temperature.

The voltage signal obtained from the resonance circuit 12 is amplified by an amplifier 13. The gain of the amplifier 13 is set to such a level that the output of the analog comparator 14 caused by the internal noise of the amplifier 13, when there is no lightwave signal, will take on binary signals "0" and "1" at random. Refer to FIG. 15(d). The output signal of the amplifier 13 is input to the + terminal of the analog comparator 14. To the − terminal of the analog comparator 14, an integral signal is obtained by integrating the output signal of the amplifier 13 for a sufficiently long time constant compared with the turn-on duration of the lightwave signal. Since the amplifier 13 is constructed of a noninverting amplifier, the output signal of the analog comparator 14 in the turn-on period of the lightwave signal becomes 1. Refer to FIG. 15(e).

The output of the analog comparator 14 is input to an adder 15. The adder 15, in synchronism with the highly stable reference clock of the crystal 17 with a shorter cycle than the pulsed lightwave, adds the output signal "0" or "1" of the analog comparator 14 to the data in a RAM 16 at the address designated by an address counter 19 and writes the sum into the RAM 16.

Figure 15:
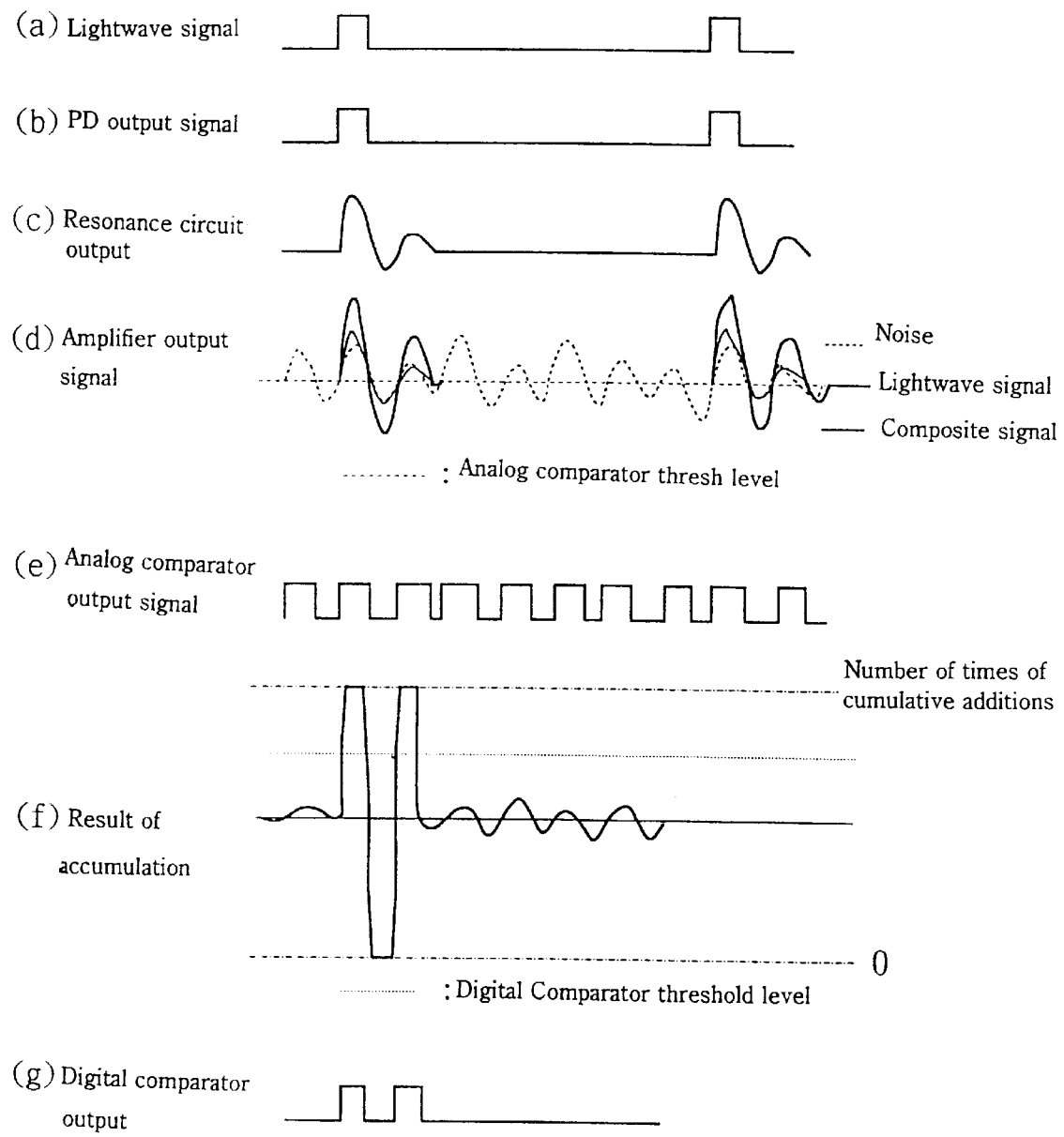
FIG. 15 shows various signals in which (a)–(g) are explanatory drawings of lightwave communication.
Figure 17:
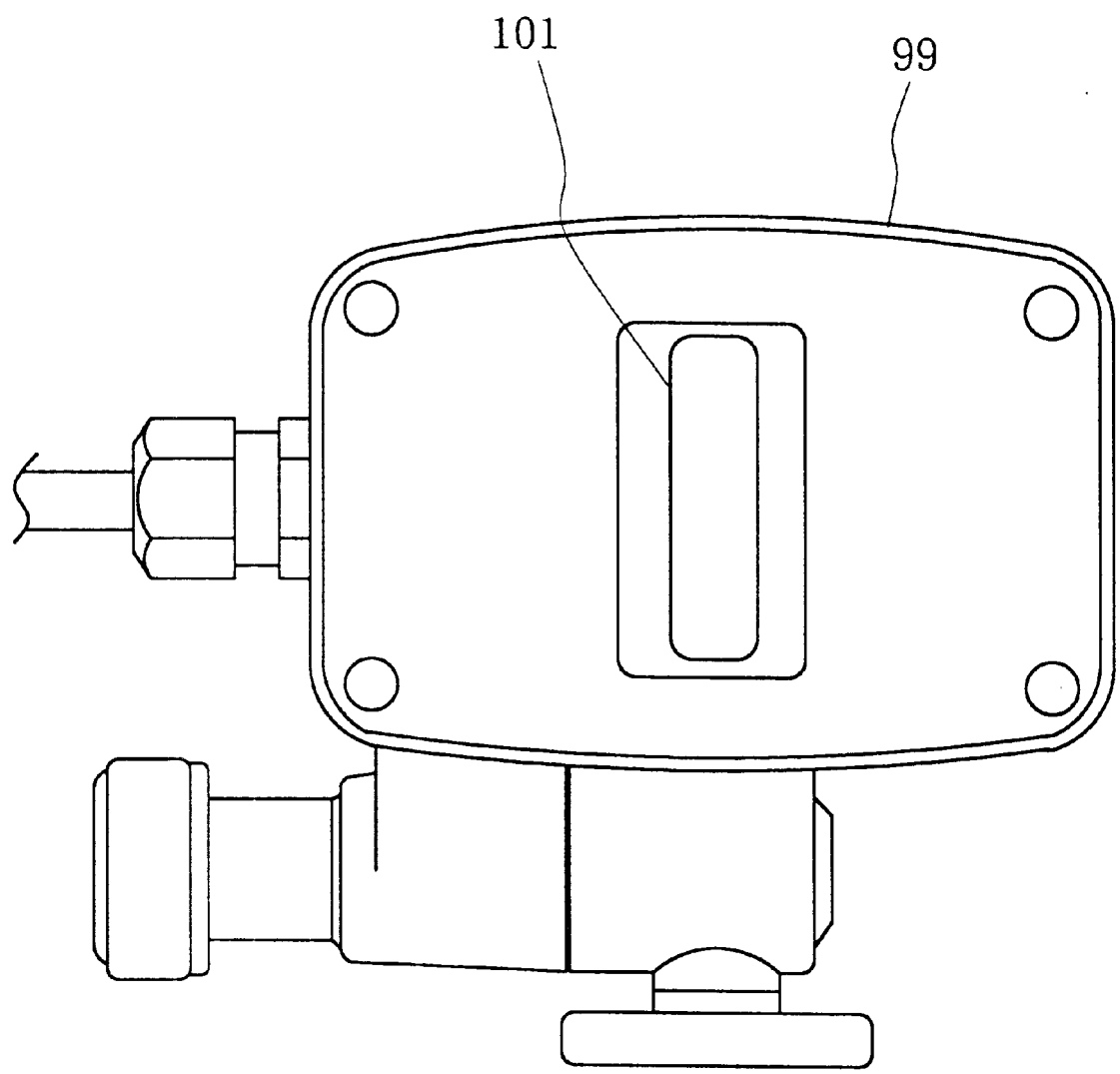
FIG. 17 is a front view of the light sensing portion.

Since the RAM 16 has addresses corresponding to the cycle of the pulsed lightwave, by causing the address counter 19 to operate a predetermined number of times from 0 to MSB, the result of cumulative additions, performed the predetermined number of times, of the output signal of the analog comparator 14 at a certain portion of the cycle of the pulsed lightwave can be recorded at a certain address of the RAM 16. Thus, the results of the cumulative additions corresponding to one cycle of the pulsed lightwave can be recorded in the RAM 16. Refer to FIG. 15(*f*). The number of times of cumulative additions is such that allows the averaging process to be performed by repeating the additions during the period of time when the crystal 41 on the light emitting side and the crystal 17 on the light detecting side are considered to be virtually in synchronism.

The data at all of the addresses of the RAM 16 obtained as the result of the averaging process are sent from the RAM 16 to a digital comparator 20. The digital comparator 20 generates its output signal only when the data is over a predetermined value (threshold level), i.e., it processes the data into a binary digital signal which takes on the value "1" in the turned-on period of the lightwave signal and "0" in the turned-off period of the lightwave signal. Since, a resonance circuit is used as the load of the PD 11 in the present embodiment, it sometimes occurs when the light power received by the PD 11 is great that the output of the digital comparator 20 becomes "1" at a time not in the turned-on period of the lightwave signal, on account of a damping waveform of the resonance circuit (FIG. 15*g*). Therefore, such signal processing may be practiced as to input the output of the digital comparator to a retriggered monostable multivibrator or the like so that one pulse of output signal is obtained corresponding to one pulse of lightwave signal. A monostable multivibrator generates a pulse for a predetermined interval in response to a rise or fall of the input signal. Retriggering is such a function that, when a rising or falling signal is input to the monostable multivibrator while it is outputting a pulse, allows the output pulse to be extended for a predetermined interval from the point of arrival of the input signal. Further, it is adapted such that, while the data are being sent to the digital comparator 20, the data in the RAM 16 are prevented from being sent to the adder 15 by means of a reset circuit 18. Thus, after new data have been written in the RAM 16 at all of its addresses, the next averaging process is started.

In the averaging process here, the operation to divide by the averaging number of times is not carried out. This is because the averaging number of times is a predetermined constant and equivalent results can be obtained by detecting the signals using a value before being divided, and thereby the circuit configuration is simplified.

Figure 8:
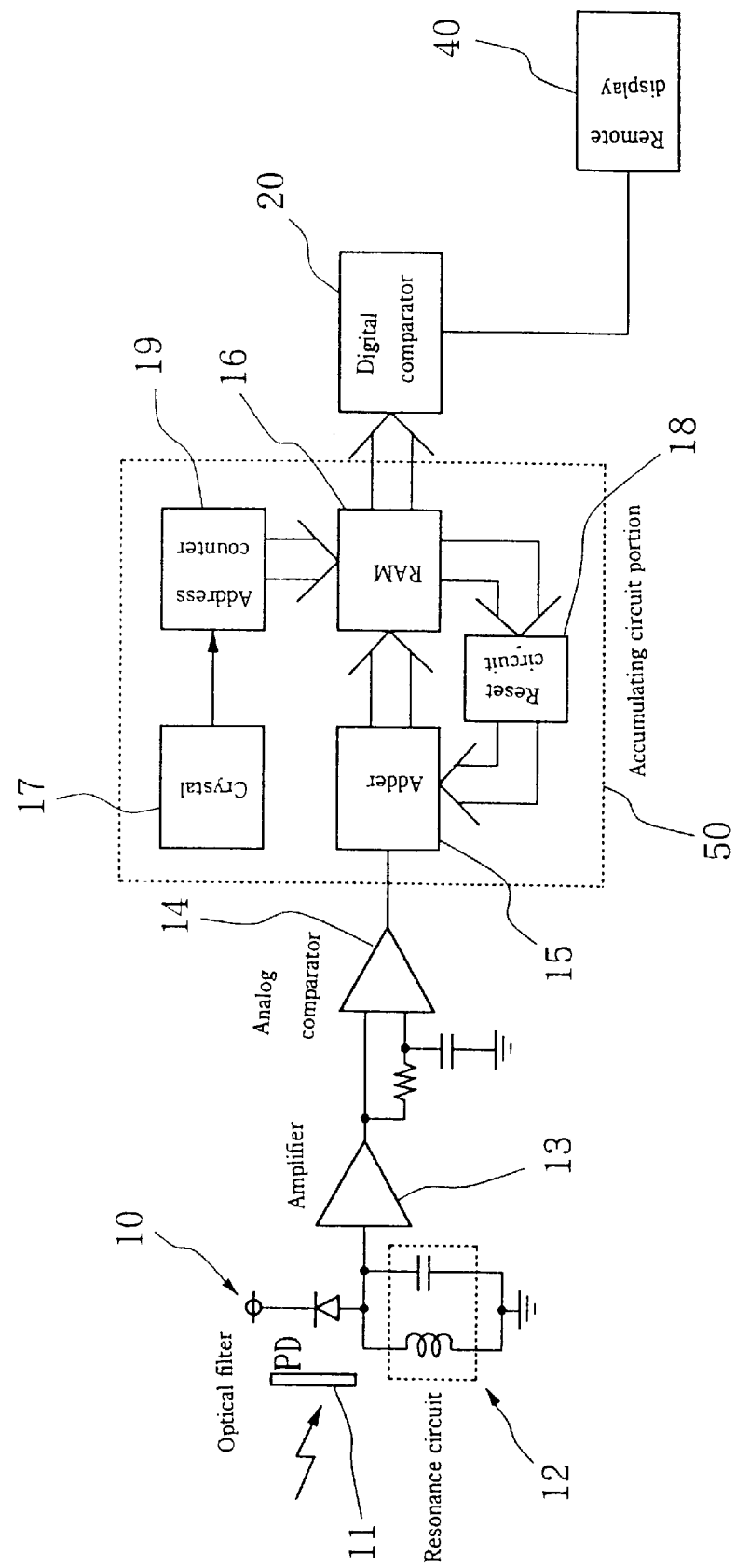
FIG. 8 is a block diagram showing the light sensing function performed on the remote display side.
Figure 9:
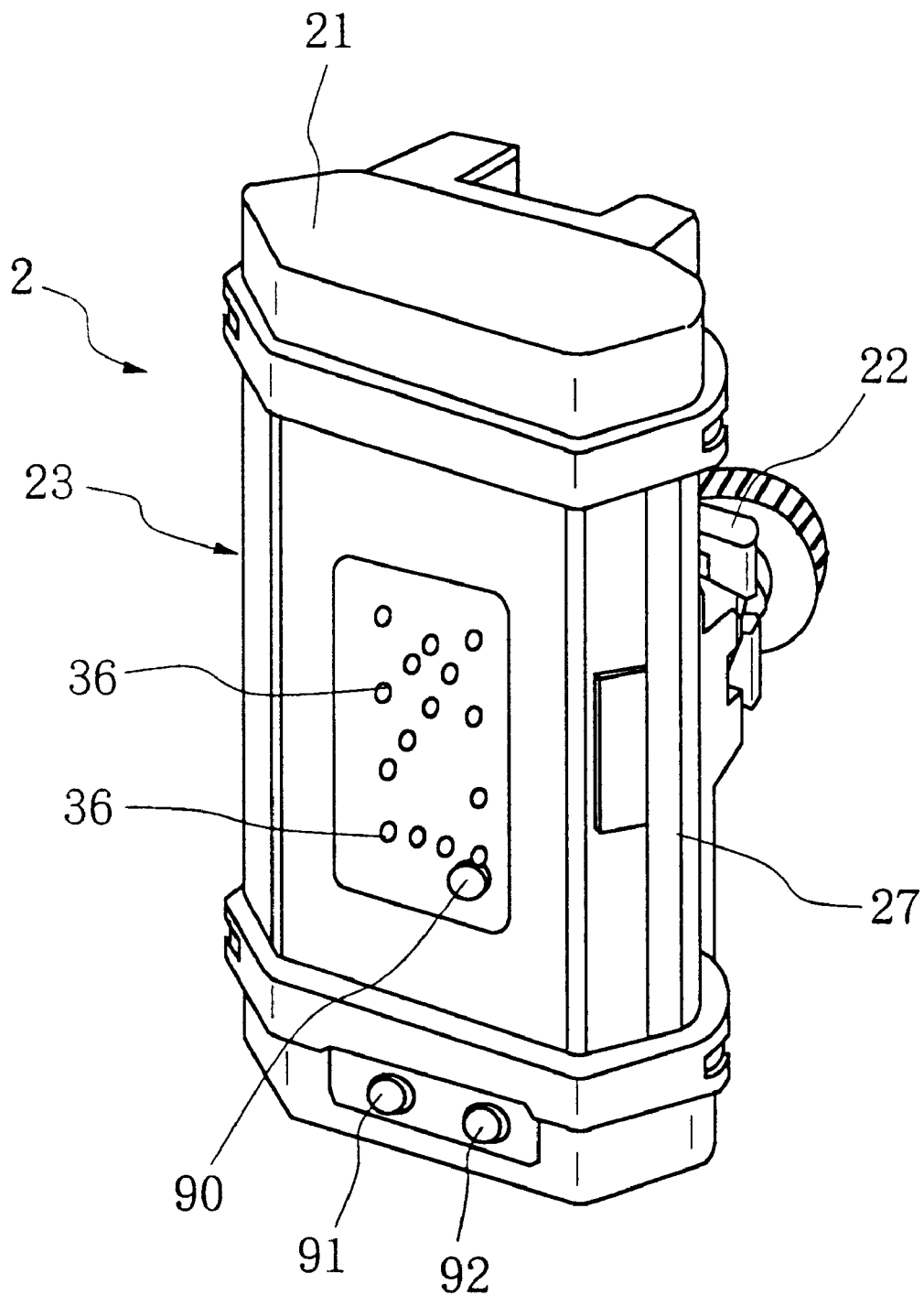
FIG. 9 is a perspective view showing a level sensor.

When the averaging process is performed by means of A/D conversion, the analog comparator in FIG. 8 may be replaced with an A/D converter.

Since the lightwave communication system described above is employed in the present embodiment, satisfactory communication can be maintained even when the light power is so small as the SIN ratio is less than 1. Hence, the light power from the light emitting side is kept low and the electric current consumed can be reduced.

According to the displaying apparatus for a construction machine of the invention, it is made possible to tolerate violent motions of the construction machine with a blade and to allow the remote display to operate without causing a malfunction even when a plurality of construction machines operate at spots in close vicinity and, thus, engineering work can be carried out efficiently.

When a longitudinally elongated filter is disposed on the outer side of the light sensing device and the directionality of the light sensing device is set as defined in claim 3, the apparatus is enabled to cope well with motion of the blade in the vertical direction.

When two level sensors are disposed above the blade with one on the left-hand side and the other on the right-hand side and adapted such that information from each thereof is displayed on the corresponding display, the inclination of the blade to the left or right can be checked and the ground leveling work can be carried out more efficiently.

What is claimed is:

1. In a construction machine comprising a machine body, an operator's seat attached to the machine body and a blade moveable relative to the machine body, a displaying apparatus comprising:

a level sensor placed relative to the blade for detecting a laser beam emitted from a laser device so as to obtain a detected datum;

a remote display placed near the operator's seat for displaying information on the basis of the detected datum; and light transmitting means for transmitting information from the level sensor to the remote display by means of a lightwave signal.

2. A displaying apparatus as defined in claim 1, wherein the light transmitting means comprises:

a light emitting device for signal transmission disposed on the level sensor; and a light sensing device corresponding to the light emitting device disposed on the remote display;

the information being transmitted from the light emitting device to the light sensing device by means of the lightwave signal.

3. A displaying apparatus as defined in claim 1, wherein the level sensor is disposed above the blade on a left-hand side and a right-hand side as a pair of level sensors, and information from each thereof is adapted to be displayed on the remote display.

4. A displaying apparatus as defined in claim 1, further comprising a long filter at the light transmitting means whereby the light transmitting means has a directionality of ±10 degrees to ±30 degrees in a horizontal direction and ±30 degrees to 90 degrees in a vertical direction.

5. A displaying apparatus as defined in claim 2, wherein the level sensor is disposed above the blade on a left-hand side and a right-hand side as a pair of level sensors, and information from each thereof is adapted to be displayed on the remote display.

6. A displaying apparatus as defined in claim 2, further comprising a long filter at the light sensing device whereby the light sensing device has a directionality of ±10 degrees to ±30 degrees in a horizontal direction and ±30 degrees to 90 degrees in a vertical direction.

* * * * *